J. P. SMITH.
SHOCKING MACHINE FOR GRAIN AND THE LIKE.
APPLICATION FILED JAN. 29, 1914.
1,226,398. Patented May 15, 1917.
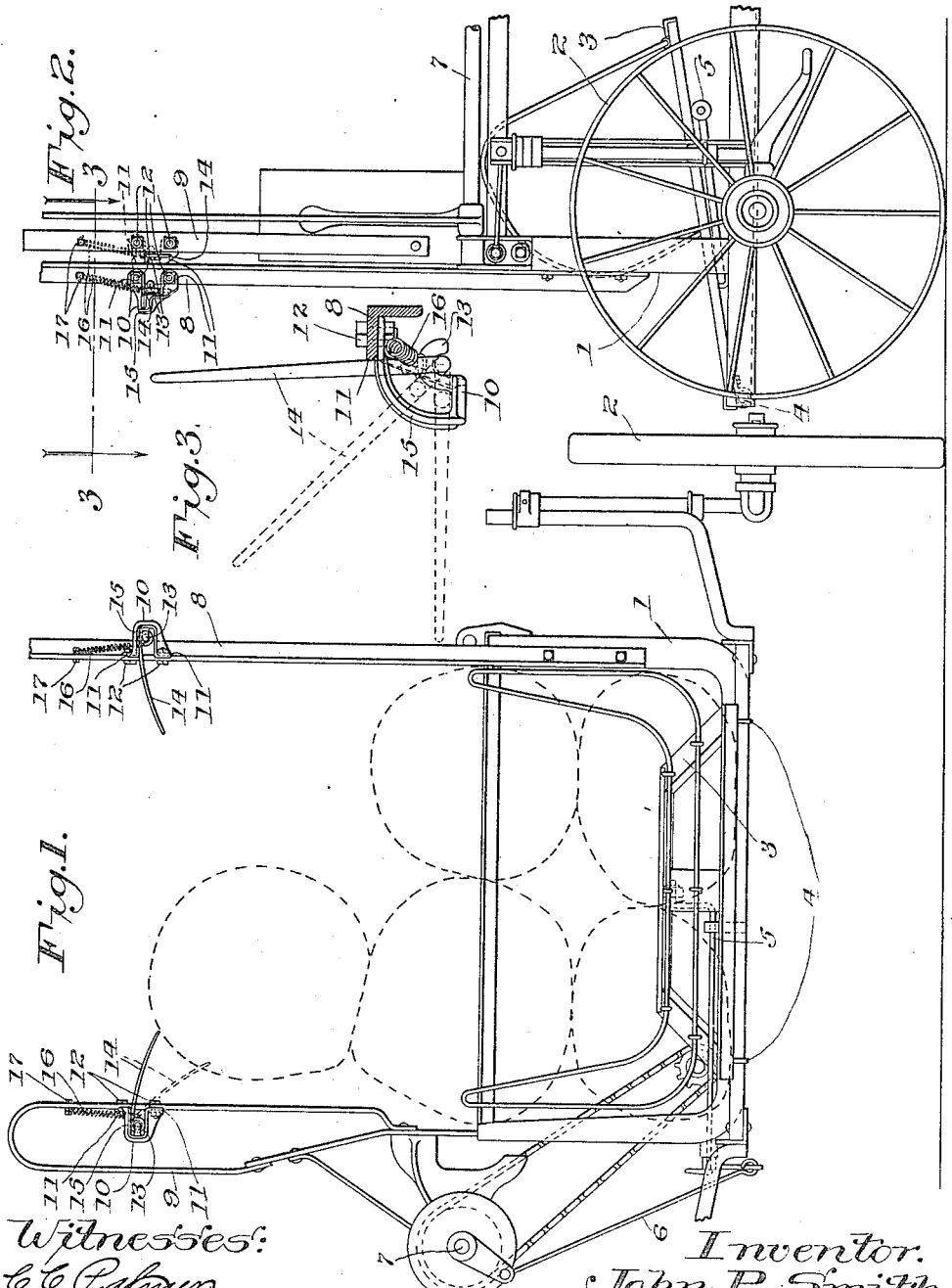

UNITED STATES PATENT OFFICE.

JOHN P. SMITH, OF CHICAGO, ILLINOIS, ASSIGNOR TO INTERNATIONAL HARVESTER COMPANY OF NEW JERSEY, A CORPORATION OF NEW JERSEY.

SHOCKING-MACHINE FOR GRAIN AND THE LIKE.

1,226,398. Specification of Letters Patent. Patented May 15, 1917.

Application filed January 29, 1914. Serial No. 815,139.

*To all whom it may concern:*

Be it known that I, JOHN P. SMITH, a citizen of the United States, residing at Chicago, in the county of Cook and State of Illinois, have invented certain new and useful Improvements in Shocking-Machines for Grain and the like, of which the following is a full, clear, and exact specification.

My invention relates to shocking machines for grain and the like.

In shocking machines of the type wherein the shock is built prostrate in a shocker cradle it has heretofore been proposed to provide resilient means carried on standards on the shocker frame at the sides of the cradle, which, while permitting the sheaves to be freely delivered to and discharged from the cradle, prevent any such shifting movement of the sheaves in the latter as would interfere with the binding or setting of the shock.

My invention has for its object to improve and simplify such holding means for the sheaves in such a manner that efficiency and life of the same are materially prolonged. I attain this object by the provision of improved holding members resiliently mounted on the frame standards in an improved manner as hereinafter described.

In the accompanying drawings I have illustrated one embodiment which my invention may assume in practice.

Figure 1 is a rear elevation of a shocker equipped with my improvement;

Fig. 2 is a side elevation of the same;

Fig. 3 is a sectional view taken on line 3—3 of Fig. 2, looking in the direction of the arrow, showing the detail of the holding mechanism.

The shocker shown is of the standard Raney construction, comprising a frame 1, transport wheels 2, a sheaf receptacle or cradle 3 pivoted at 4 upon the rear of the frame and normally reclining thereon, and cradle dumping mechanism 5 operatively connected, through suitable mechanism 6, to the knotter shaft 7 of the shocker. As in the usual Raney construction, the frame 1 is also provided with a plurality of upstanding arms or standards 8 and 9, disposed at the rear thereof and on opposite sides of the cradle 3, the standard 8 preferably being formed of angle material, while the standard 9 is formed of a flat bowed strip. Both of these standards project up a substantial distance above the top of the cradle. Carried upon these standards, at a point near their upper ends and projecting inwardly toward each other and over the cradle bottom, are my improved sheaf positioning members.

As shown, a substantial U-shaped bracket 10 (Fig. 1), having a plurality of oppositely disposed lugs 11, is attached to the side of each of the standards 8 and 9 by means of bolts 12 passing through these lugs. Pivoted upon a horizonally disposed hook or lug 13, projecting inwardly and forwardly from the rear end of each bracket (Fig. 3), is a sheaf holding member shown in the form of a rigid tine 14, preferably slightly downwardly curved toward its inner end. This tine 14 is provided with an eye-shaped outer end which fits around the hook 13 in such a manner as to attach the tine thereto and at the same time permit the tine to be swung downwardly or rearwardly about the hook 13 as an axis, toward or from the dotted line positions shown in Figs. 1 and 3. In this connection it is to be noted that the normal position of the tine; *i. e.*, wherein the same strikes against the edge of the standard, is shown in full lines in Fig. 3, and that the extreme rearward position of the same is shown in the lower dotted line position therein indicated, wherein the tine strikes against the abutment formed by the end wall of the U-shaped bracket member, illustrated more clearly in Fig. 1. It is further to be noted that the tine is guided in its movement in a horizontal plane by an arcuate, horizontally disposed rearwardly extending guiding portion 15 formed integral with the bracket against the lower surface of which the tine 14 is normally held in contact by a helical spring 16, having its lower end attached to the tine at a point adjacent its pivot and extending upward and slightly forward to a point 17, where its upper end is attached to the standard.

As the sheaves are delivered to the sheaf receiving cradle 3, either normally or, for instance, in the manner that the same are delivered in shockers of the well known Raney type, the tines 14 will obviously yield when struck by a sheaf, turning downwardly about their pivots on the hooks 13, as shown in Fig. 1, in such a manner as to permit the sheaves to be placed in the cradle. Obviously, when the sheaves have passed the tines the spring 16 will again pull the same upward to their up, or normal positions indicated in full lines in Figs. 1 and 3. During the dumping of the shock; i. e., as the cradle 3 moves backward about its pivot on the frame and the prostrate sheaves therein are turned to vertical position, it is likewise obvious that when the sheaves strike the tines 14, the latter will yield freely rearwardly toward the dotted line positions shown in Fig. 3 in such a manner as not to interfere with the dumping operation, the springs 16 in this instance also acting to return the tines to their normal position, due to the fact that the turning action of the tines as they move outward stores in the springs not only the energy requisite to pull the tines 14 toward the surface of the arcuate portion 15, but also to swing the same around on their pivots to the full line position shown.

It is to be noted that in this construction, by the provision of the rigid tines and the pivoting of the same upon the standards all tendency for the holding means to bend or break in service is effectually prevented, the tines swinging freely downward or backward about substantial pivots on the brackets. It is also to be noted that, due to the improved spring returning mechanism therefor and the improved manner of connecting the same to the tines, the strain upon these springs is also minimized at the same time that a rugged and simple construction is provided.

While I have in this application described one form which my invention may assume in practice, it is, of course, to be understood that the embodiment shown herein is used for purposes of illustration and may be modified without departing from the spirit of my invention.

What I claim as my invention, and desire to secure by Letters Patent, is:

1. In a shocker, a shocker frame having an upstanding arm thereon, and a laterally extending sheaf holding member pivotally mounted upon said arm and movable downwardly and rearwardly with respect thereto.

2. In a shocker, a shocker frame having an upstanding arm thereon, a sheaf holding member pivotally mounted upon said arm and movable downwardly and rearwardly about its pivot, and means for retaining said member normally in laterally extending position.

3. In a shocker, a shocker frame having an upstanding arm thereon, a sheaf holding member pivotally mounted upon said arm and movable downwardly and rearwardly about its pivot, and resilient means for retaining said member normally in laterally extending position.

4. In a shocker, a sheaf receptacle, a frame supporting said sheaf receptacle and having standards located on the opposite sides thereof, a sheaf holding member mounted on a substantially horizontal pivot upon each of said standards above said receptacle, and means for normally retaining said members projecting laterally above said receptacle.

5. In a shocker, a sheaf receptacle, a frame carrying said receptacle and having standards thereon located at the opposite sides of said receptacle, a sheaf holding member mounted on a substantially horizontal pivot upon each of said standards above said receptacle, and resilient means for normally retaining said members projecting laterally above said receptacle.

6. In a shocker, a frame having standards thereon spaced apart transversely from each other, a dumping sheaf receptacle carried on said frame between said standards, a downwardly and laterally movable sheaf holding member pivotally mounted upon each of said standards above said receptacle and projectable laterally into the interval between said standards, and means for normally holding the same in projected position.

7. In a shocker, a frame having standards thereon spaced apart transversely from each other, a dumping sheaf receptacle carried on said frame between said standards, a downwardly and laterally movable sheaf holding member pivotally mounted upon each of said standards above said receptacle projectable laterally into the interval between said standards and resilient means for normally holding the same in projected position.

8. In a shocker, a frame having standards thereon spaced apart transversely from each other, a sheaf receptacle carried on said frame between said standards, a tine pivotally mounted upon each of said standards above said receptacle and movable downwardly and laterally about its pivot, and resilient connections between said tines and said standards operatively connected to the former at points at one side of their pivots.

9. In a shocker, a frame having upstanding arms thereon spaced apart transversely from each other, an upwardly and rearwardly movable sheaf receptacle pivoted on said frame between said arms, a downwardly and rearwardly movable sheaf holding member pivotally mounted upon each of said arms above said receptacle, and resilient connections between said members and said arms normally maintaining the former projecting laterally with respect to said arms and above said receptacle.

10. In a shocker, a frame having upstanding arms thereon spaced apart transversely from each other, an upwardly and rearwardly movable shock receptacle pivoted on said frame between said arms, a downwardly and rearwardly movable tine pivotally mounted upon each of said arms above said receptacle, and coiled springs operatively connected at one of their ends to said arms and at their opposite ends to said tines at points at one side of their pivots normally maintaining said tines projecting laterally into the interval between said arms and above said receptacle.

11. In a shocking machine, a frame having upstanding transversely spaced arms thereon, brackets carried on said arms having rearwardly disposed guiding surfaces thereon, sheaf holding members pivotally connected to said brackets and movable downwardly and rearwardly about their pivots, and resilient connections between said members and a fixed part of the frame whereby said members are normally maintained projecting laterally into the interval between said arms and in engagement with said guiding surfaces.

12. In a shocking machine, a frame having an upstanding arm thereon, a bracket carried on said arm, having a forwardly extending lug thereon and a horizontally disposed substantially arcuate guiding surface extending in a plane above said lug, a rigid tine movable about a pivot on said lug, extending laterally with respect to said arm, and resilient connections between said tine and a fixed portion of said arm normally retaining said tine in contact with the guiding surface of said bracket.

13. In a shocking machine, a frame having an upstanding arm, a bracket member carried thereon and extending rearwardly therefrom having a laterally disposed lug intermediate its ends, and an arcuate horizontally disposed guiding ledge having an abutment at the outer end thereof, a tine pivoted on said lug and movable about the same as an axis guided by said guiding ledge and limited in its movement by said abutment, and a resilient connection between said tine and a portion of said arm.

14. In a shocking machine, a frame having an upstanding arm thereon, a bracket member carried on said arm extending rearwardly therefrom, said bracket having a laterally disposed lug intermediate its ends and a horizontal laterally extending arcuate guiding ledge provided with an abutment at its outer end, a tine pivoted on said lug and movable both laterally and vertically about the same as an axis, said tine being guided by said guiding ledge and limited in its lateral movement by engagement with said abutment and the side of said arm, and a coiled spring extending upwardly and laterally therefrom, having one end attached to said tine at one side of the tine pivot and the other end attached to said arm.

15. In a shocking machine, a frame having a plurality of upstanding arms thereon spaced apart transversely from each other, a normally prostrate rearwardly dumping shock receptacle pivoted at its rear end on said frame and movable upwardly and rearwardly between said arms, brackets carried on said arms above said receptacle having rearwardly disposed substantially horizontal guiding surfaces, tines pivoted on said brackets and engageable with said guiding surfaces movable downwardly and rearwardly about their pivots, and means operatively connected between said tines and said arms whereby said tines are normally maintained projecting laterally toward each other in the interval between said arms and above said receptacle and are automatically returned to this position after their depression by sheaves dropped in the receptacle and after their rearward movement by the sheaves in said receptacle as the latter is dumped.

In testimony whereof I affix my signature, in the presence of two witnesses.

JOHN P. SMITH.

Witnesses:
C. R. RANEY,
R. W. MARTIN.

Copies of this patent may be obtained for five cents each, by addressing the "Commissioner of Patents, Washington, D. C."